U. BUSHNELL.
Cheese Hoop.

No. 8,625.

Patented Jan. 6, 1852.

UNITED STATES PATENT OFFICE.

UPSON BUSHNELL, OF GUSTAVUS, OHIO.

MODE OF COVERING CHEESES.

Specification of Letters Patent No. 8,625, dated January 6, 1852.

*To all whom it may concern:*

Be it known that I, UPSON BUSHNELL, of Gustavus, in the county of Trumbull and State of Ohio, have invented a new and Improved Apparatus for Putting Sacks Upon Cheeses; and I declare the following to be a full, clear, and exact description of the construction and operation of the same, reference being had to the annexed drawings, making a part of this specification, in which—

Figure 2:
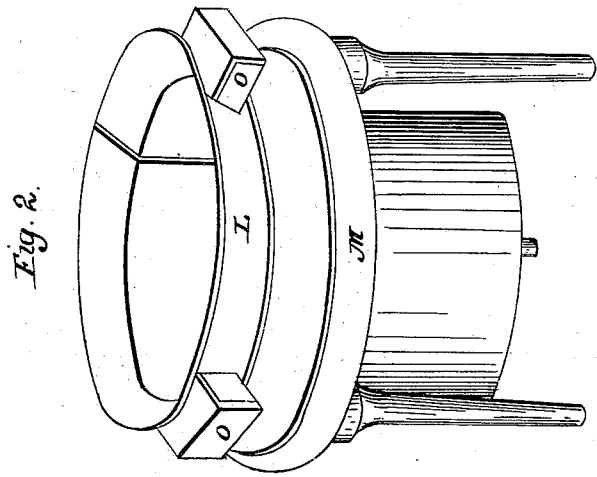
Figure 1:
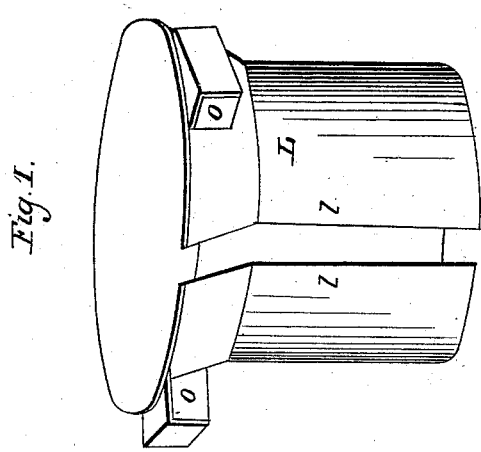

Figure 1 represents a spring cylinder and Fig. 2 the same cylinder and stool together.

The sacking cylinder L, may be formed of tin, zinc, brass or other suitable material and open at one side as shown at $l$, $l$, of any required size; having cleats attached to the top by which it may be suspended within the stool. The stool M (Fig. 2) is a circular frame upon legs of a suitable size to sustain the cylinder and cheese. Through the top of the stool is a circular opening of a proper size to admit freely, the cylinder with a sack upon it, so that it will be suspended by the cleats $o$, $o$. The sacks for the cheeses having been previously prepared of the proper size, the cylinder is then compressed together so that it will easily enter the mouth of the sack which is then drawn on to the cylinder. The cylinder with the sack upon it, is then put into the stool as shown at Fig. 2, when the cheese is passed through the cylinder receiving the sack upon it and thus becomes neatly and quickly covered, leaving only the top to be sewed on.

I claim as my invention and desire to secure by Letters Patent,

The spring cylinder with cleats and open at the side, in combination with the framed stool, with circular opening to admit and hold the cylinder within the sack while the cheese shall be passed through; all as herein described and for the purposes stated.

UPSON BUSHNELL.

Witnesses:
 HARMON COLE,
 LYMAN P. ANDREWS.